US010740537B2

(12) United States Patent
Chauhan et al.

(10) Patent No.: US 10,740,537 B2
(45) Date of Patent: Aug. 11, 2020

(54) ENTERPRISE FORM DEPENDENCY VISUALIZATION AND MANAGEMENT

(71) Applicant: Dell Products L.P., Round Rock, TX (US)

(72) Inventors: Vivek Chauhan, Haryana (IN); Gnanasambandam Palaniswami, Shrewsbury, MA (US); Ankita Rathi, Bhilwara (IN); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/177,993

(22) Filed: Nov. 1, 2018

(65) Prior Publication Data

US 2020/0142953 A1   May 7, 2020

(51) Int. Cl.
*G06F 40/137* (2020.01)
*G06F 16/901* (2019.01)
(Continued)

(52) U.S. Cl.
CPC ........ *G06F 40/137* (2020.01); *G06F 16/9024* (2019.01); *G06F 40/154* (2020.01); *G06F 3/0486* (2013.01)

(58) Field of Classification Search
CPC ............... G06F 17/2241; G06F 17/227; G06F 16/9024; G06F 3/0486
(Continued)

(56) References Cited

U.S. PATENT DOCUMENTS 5,689,711 A * 11/1997 Bardasz ................... G06F 8/34
                                                    345/420
6,359,637 B1 * 3/2002 Perkins ............... G06F 16/9027
                                                    715/853
(Continued)

OTHER PUBLICATIONS

Ron Cytron et al., ACM Transactions on Programming Languages and Systems, Efficiently Computing Static Single Assignment Form and the Control Dependence Graph, vol. 13, No. 4, Oct. 1991, pp. 451-490.*

(Continued)

*Primary Examiner* — Andrew R Dyer
(74) *Attorney, Agent, or Firm* — Ryan, Mason & Lewis, LLP

(57) ABSTRACT

Methods, apparatus, and processor-readable storage media related to enterprise form dependency visualization and management are provided herein. An example computer-implemented method includes transforming an enterprise form from a given format into a hierarchical representation; generating a visualization of a set of one or more configurable form dependencies within the hierarchical representation; updating, in response to user input, the visualization of the set of one or more configurable form dependencies; generating an updated version of the enterprise form by modifying, in response to updating the visualization of the set of one or more configurable form dependencies, one or more form dependency rules of the enterprise form in a presentation layer associated with the enterprise form; and dynamically outputting the updated version of the enterprise form to at least one user.

20 Claims, 16 Drawing Sheets

(51) Int. Cl.
*G06F 40/154* (2020.01)
*G06F 3/0486* (2013.01)

(58) Field of Classification Search
USPC .................................. 715/221, 223, 272
See application file for complete search history.

(56) References Cited

U.S. PATENT DOCUMENTS

| | | | | |
|---|---|---|---|---|
| 6,704,454 | B1* | 3/2004 | Spence | G06K 9/52 |
| | | | | 382/240 |
| 6,922,807 | B1* | 7/2005 | Miyata | G06F 17/243 |
| | | | | 715/203 |
| 7,065,717 | B1* | 6/2006 | Perkins | G06F 8/73 |
| | | | | 715/804 |
| 7,281,018 | B1* | 10/2007 | Begun | G06F 17/218 |
| 7,509,244 | B1* | 3/2009 | Shakeri | G06F 9/5044 |
| | | | | 703/7 |
| 7,693,848 | B2* | 4/2010 | Dejean | G06F 16/84 |
| | | | | 715/242 |
| 7,716,179 | B1* | 5/2010 | Agapiev | H04L 67/104 |
| | | | | 707/622 |
| 8,122,050 | B2 | 2/2012 | Mordvinov | |
| 8,307,109 | B2 | 11/2012 | Mamou et al. | |
| 8,478,616 | B2 | 7/2013 | De Klerk et al. | |
| 8,706,667 | B2* | 4/2014 | Stanfill | G06N 20/00 |
| | | | | 706/45 |
| 8,719,066 | B2 | 5/2014 | Cartwright | |
| 8,856,724 | B2 | 10/2014 | Somani et al. | |
| 8,863,069 | B1* | 10/2014 | Venkataramani | G06F 17/5045 |
| | | | | 716/134 |
| 9,329,838 | B2 | 5/2016 | Tattrie | |
| 9,619,445 | B1* | 4/2017 | Neuberg | G06F 40/14 |
| 10,019,239 | B2 | 7/2018 | Tattrie | |
| 10,305,758 | B1* | 5/2019 | Bhide | G06F 16/2477 |
| 10,318,285 | B1 | 6/2019 | Jodoin et al. | |
| 2002/0059334 | A1* | 5/2002 | Jelbert | G06F 16/353 |
| | | | | 715/273 |
| 2002/0099732 | A1* | 7/2002 | Miller | G06F 8/00 |
| | | | | 715/201 |
| 2002/0156814 | A1* | 10/2002 | Ho | G06F 9/541 |
| | | | | 715/205 |
| 2003/0067481 | A1* | 4/2003 | Chedgey | G06F 8/34 |
| | | | | 715/738 |
| 2003/0176999 | A1* | 9/2003 | Calcagno | G06F 40/35 |
| | | | | 704/9 |
| 2006/0155700 | A1* | 7/2006 | Dejean | G06F 16/84 |
| 2006/0277231 | A1 | 12/2006 | Kral et al. | |
| 2007/0079282 | A1 | 4/2007 | Nachnani et al. | |
| 2007/0245231 | A1* | 10/2007 | Kibler | G06F 16/957 |
| | | | | 715/234 |
| 2007/0266368 | A1* | 11/2007 | Szpak | G06F 8/10 |
| | | | | 717/105 |
| 2009/0217248 | A1* | 8/2009 | Bently | G06F 8/30 |
| | | | | 717/132 |
| 2009/0240483 | A1 | 9/2009 | Adams et al. | |
| 2010/0058164 | A1* | 3/2010 | Best | G06F 17/241 |
| | | | | 715/224 |
| 2010/0079462 | A1* | 4/2010 | Breeds | G06T 11/206 |
| | | | | 345/440 |
| 2010/0211754 | A1* | 8/2010 | Crosby | G06F 9/5016 |
| | | | | 711/170 |
| 2011/0066934 | A1* | 3/2011 | Treisman | G06F 17/243 |
| | | | | 715/222 |
| 2011/0289425 | A1* | 11/2011 | Pletter | G06F 3/0481 |
| | | | | 715/744 |
| 2012/0066586 | A1* | 3/2012 | Shemesh | G06F 16/9574 |
| | | | | 715/235 |
| 2013/0152078 | A1 | 6/2013 | Arcilla et al. | |
| 2013/0332241 | A1 | 12/2013 | Taylor | |
| 2014/0006991 | A1* | 1/2014 | Kalaidjian | G06F 8/74 |
| | | | | 715/771 |
| 2014/0032480 | A1* | 1/2014 | Lesage | G06F 17/243 |
| | | | | 707/607 |
| 2014/0123061 | A1* | 5/2014 | Bennett | G16H 15/00 |
| | | | | 715/808 |
| 2014/0143763 | A1 | 5/2014 | Bhargava | |
| 2014/0279976 | A1 | 9/2014 | Davidson et al. | |
| 2014/0317045 | A1 | 10/2014 | Quine | |
| 2015/0142726 | A1 | 5/2015 | Taylor | |
| 2016/0092525 | A1 | 3/2016 | Kothari et al. | |
| 2016/0291942 | A1* | 10/2016 | Hutchison | G06F 8/451 |
| 2016/0321234 | A1* | 11/2016 | Basta | G06F 40/154 |
| 2017/0097927 | A1* | 4/2017 | Levi | G06F 40/221 |
| 2017/0115968 | A1 | 4/2017 | Fukala | |
| 2017/0124617 | A1 | 5/2017 | Spoelstra | |
| 2017/0270037 | A1 | 9/2017 | Barjaktarovic | |
| 2018/0081645 | A1 | 3/2018 | Alurralde Iturri | |
| 2018/0232456 | A1 | 8/2018 | Sherman | |
| 2018/0232648 | A1* | 8/2018 | Acharya | G06N 7/005 |
| 2018/0247243 | A1 | 8/2018 | Moolman | |
| 2018/0253296 | A1 | 9/2018 | Brebner et al. | |
| 2018/0321831 | A1 | 11/2018 | Klemenz | |
| 2019/0236226 | A1* | 8/2019 | Kuwahara | G06F 30/20 |
| 2019/0361686 | A1* | 11/2019 | Gnazdowsky | G06F 16/9024 |

OTHER PUBLICATIONS

Wikipedia, Google Forms, Oct. 28, 2018, 2 pages.
Wikipedia, Salesforce.com, Oct. 30, 2018, 16 pages.
Wikipedia, Formstack, Jul. 11, 2018, 4 pages.
Wikipedia, Typeform, Sep. 19, 2018, 3 pages.
Wikipedia, FormAssembly, May 9, 2018, 1 page.
Wikipedia, Adobe Marketing Cloud, Oct. 23, 2018, 2 pages.
Wikipedia, Word Press, Oct. 30, 2018, 14 pages.
Wikipedia, Joomla, Oct. 30, 2018, 8 pages.
AnswerModules, https://web.archive.org/web/20180823180310/http://www.answermodules.com/, Aug. 23, 2018, 5 pages.
Wufoo, www.wufoo.com, Apr. 26, 2018, 9 pages.
Wikipedia, JotForm, https://en.wikipedia.org/w/index.php?title=JotForm&oldid=787479133, Jun. 25, 2017, 2 pages.
Wikipedia, Formsite, https://en.wikipedia.org/w/index.php?title=Formsite&oldid=827087783, Feb. 22, 2018, 2 pages.
O.R. Bagheri, et al. Toward an Elastic Service Based Framework for Enterprise Application Integration, J+L ACIS International Conference on Software Engineering Research, Management & Applications (SERA 2007) Busan, 2007, pp. 711-719 (Year: 2007).
G. Berio et al. The M*-Object Methodology for Information System Design in CIM Environments, in IEEE Transactions on Systems, Man, and Cybernetics, vol. 25, No. 1, pp. 68-85, Jan. 1995, (Year: 1995).
C. Vella, et al. XPL, a Presentation Language Based on User Interface Design Pattern, 6th IEEE/ACIS International Conference on Computer and Information Science (ICIS 2007), Melbourne, Qld. 2007, pp. 285-290 (Year: 2007).

* cited by examiner

ENTERPRISE FORM DEPENDENCY VISUALIZATION AND MANAGEMENT

FIELD

The field relates generally to information processing systems, and more particularly to techniques for form processing.

BACKGROUND

Conventional application development methods often involve changing a presentation layer by updating a relational database schema and a service layer via non-elastic schema design, which is unduly time-consuming. For example, using conventional methods to update a product user interface design can take approximately 30-60 days because changes need to go through full system development life cycles at multiple application layers. Additionally, conventional methods face challenges in updating form dependencies, and cannot detect unreachable dependencies when conditional logics are being applied to form components. Such methods, accordingly, meaningfully limit efficiency and other enterprise and/or business objectives.

SUMMARY

Illustrative embodiments of the invention provide techniques for enterprise form dependency visualization and management. An example computer-implemented method includes transforming an enterprise form from a given format into a hierarchical representation, and generating a visualization of a set of one or more configurable form dependencies within the hierarchical representation. Such a method can also include updating, in response to user input, the visualization of the set of one or more configurable form dependencies, and generating an updated version of the enterprise form by modifying, in response to updating the visualization of the set of one or more configurable form dependencies, one or more form dependency rules of the enterprise form in a presentation layer associated with the enterprise form. Further, such a method can additionally include dynamically outputting the updated version of the enterprise form to at least one user.

Illustrative embodiments can provide significant advantages relative to conventional application development methods. For example, challenges associated with updating form dependencies are overcome through the generation of JAVASCRIPT object notation (JSON) representations in collapsible hierarchical tree schema designs. Such techniques enable form designers to visualize conditional logics in an efficient graphical manner, as well as enable designers to make decisions based on form dependency component rules.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
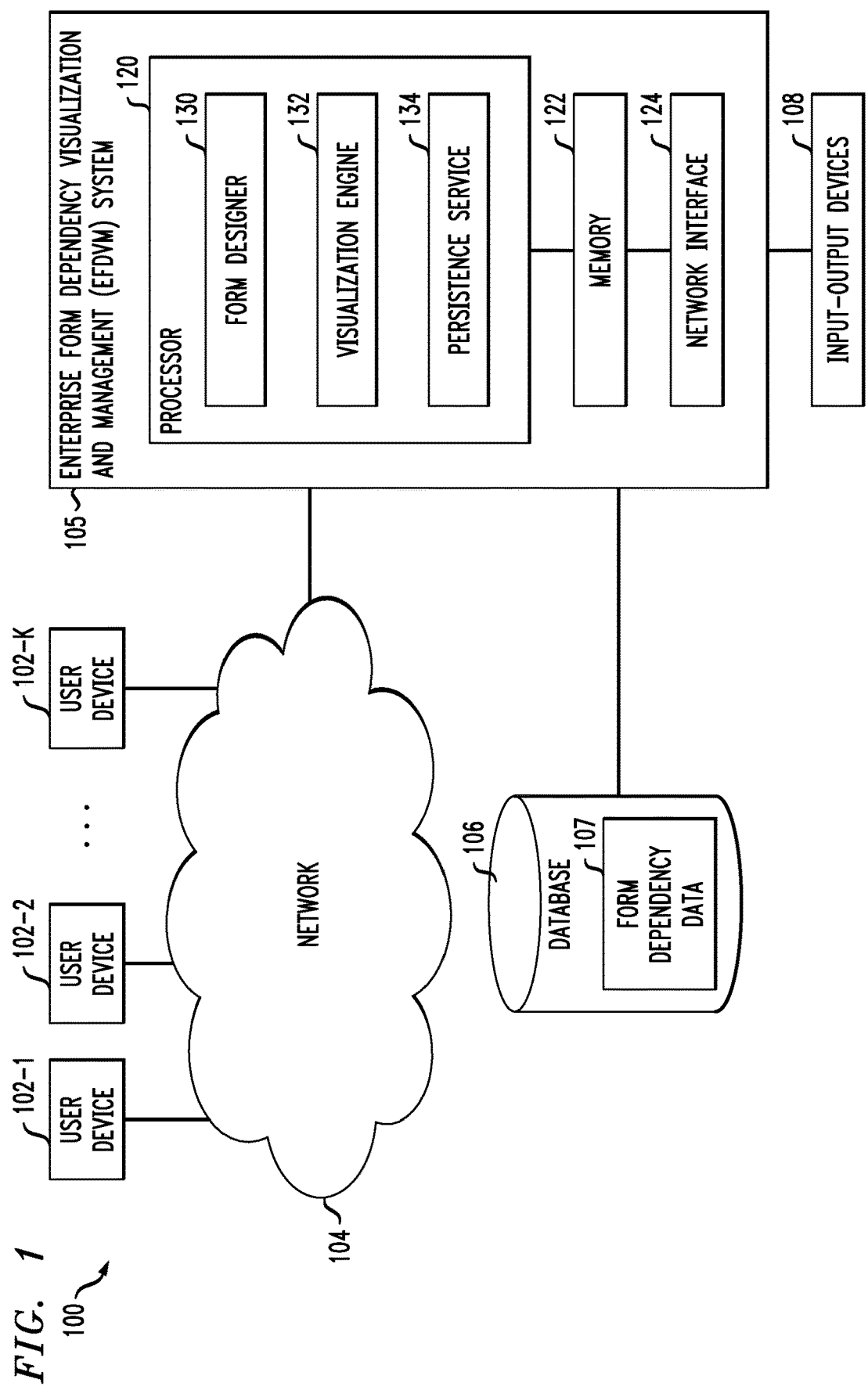
FIG. 1 shows an information processing system configured for application development via presentation layer management in an illustrative embodiment of the invention.

FIG. 1 shows a computer network (also referred to herein as an information processing system) 100 configured in accordance with an illustrative embodiment of the invention. The computer network 100 includes a plurality of user devices 102-1, 102-2, . . . 102-K, collectively referred to herein as user devices 102. The user devices 102 are coupled to a network 104, where the network 104 in this embodiment is assumed to represent a sub-network or other related portion of computer network 100. Accordingly, elements 100 and 104 are both referred to herein as examples of "networks" but the latter is assumed to be a component of the former in the context of the FIG. 1 embodiment. Also coupled to network 104 is enterprise form dependency visualization and management (EFDVM) system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The EFDVM system 105 has an associated database 106 configured to store data characterizing user interface components for a plurality of applications and/or versions thereof. The database 106 more particularly stores form dependency data 107 illustratively comprising components, values, relational structured details, conditional logic, hierarchical visualizations, etc.

The database 106 in the present embodiment is implemented using one or more storage systems associated with the EFDVM system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the EFDVM system 105 are input-output devices 108, which illustratively comprise keyboards, displays or other types of input-output devices in any combination. Such input-output devices are used to support one or more user interfaces to the EFDVM system 105, as well as to support communication between the EFDVM system 105 and other related systems and devices not explicitly shown.

The EFDVM system 105 in the FIG. 1 embodiment is assumed to be implemented using at least one processing device. Each such processing device generally comprises at least one processor and an associated memory, and implements one or more functional modules for controlling certain features of the EFDVM system 105.

More particularly, the EFDVM system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the EFDVM system 105 to communicate over the network 104 with the user devices 102, and illustratively comprises one or more conventional transceivers.

The processor 120 further comprises a form designer 130, a visualization engine 132, and a persistence service 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the form designer 130, visualization engine 132, and persistence service 134 may be implemented at least in part in the form of software that is stored in memory 122 and executed by processor 120.

It is to be understood that the particular set of elements shown in FIG. 1 for providing an enterprise services framework for presentation layer management involving user devices 102 of computer network 100 is presented by way of illustrative example only, and in other embodiments, additional or alternative elements may be used. Thus, another embodiment may include additional or alternative systems, devices and other network entities, as well as different arrangements of modules and other components.

By way of example, in other embodiments, the EFDVM system 105 can be eliminated and associated elements such as form designer 130, visualization engine 132, and persistence service 134 can be implemented elsewhere in the computer network 100.

An exemplary process utilizing form designer 130, visualization engine 132, and persistence service 134 of the EFDVM system 105 in computer network 100 will be described in more detail with reference to the flow diagram of FIG. 12.

At least one embodiment of the invention includes providing a real-time solution implemented via data-driven form modification and an elastic schema, which can facilitate an improved user experience. Such an embodiment includes generating and implementing an application programming interface (API) which can enable integration with enterprise applications and provide real-time updates to such applications, while preserving existing values entered by users in such applications. Further, as detailed herein, one or more embodiments of the invention can include carrying out such functions as described above and herein with zero wait-time or down-time.

Additionally, an EFDVM system (such as system 105) implemented via one or more embodiments of the invention can generate form component rules logics and data visualization in a graphical manner, as well as apply logical rules in an efficient way using a tree visualization (which can go N-levels deep) and provide a drag-and-drop interface to link form dependencies. Also, such an embodiment of the invention can include detecting deadlocks (that is, unreachable dependency components) and generating one or more remedial actions in connection with the business logics applied to the form.

Accordingly, at further detailed herein, one or more embodiments of the invention include implementing (approximately) real-time logic updates using an elastic schema design with persistence in graph database technology. Further, such an embodiment can include integrating scalable vector graphics (SVG) to visualize form dependencies in a web browser, and implementing a drag-and-drop mechanism for node movement in the SVG interface to directly update the form dependency rules in the presentation layer.

Figure 2:
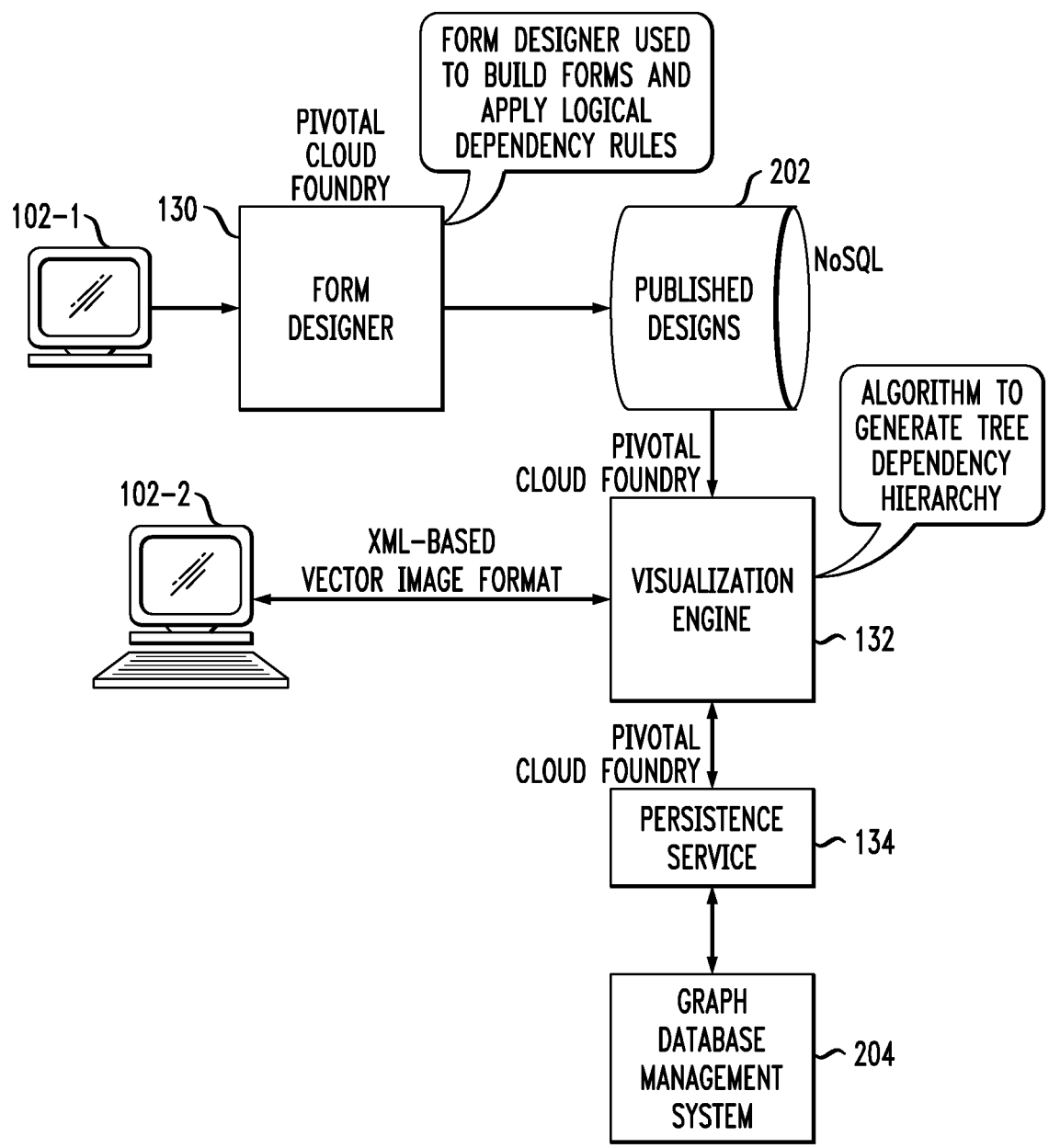
FIG. 2 shows a flow diagram for designing and visualization in an illustrative embodiment of the invention.

FIG. 2 shows a flow diagram for designing and visualization in an illustrative embodiment of the invention. By way of illustration, FIG. 2 depicts a first user device 102-1 providing input to the form designer 130 (implemented via Pivotal Cloud Foundry (PCF)), which is used to build form components and apply logical dependency rule logics (based at least in part on the inputs provided by the user device 102-1). The designs generated by form designer 130 can be output and stored in NoSQL database 202, and also provided as input to visualization engine 132 (implemented via PCF). The visualization engine 132 implements one or more algorithms to transform the form dependency rules in JSON representation into a tree dependency hierarchy. By way of example, the visualization engine 132 can convert the JSON representation of a form to detect and describe the dependency hierarchy and unreachable components. Additionally, the visualization engine 132 can interact with user device 102-2 to update one or more form dependencies in a presentation layer (for example, in approximately real-time with an SVG interface).

As also illustrated, FIG. 2 depicts persistence service 134 (also implemented via PCF), which interfaces with the visualization engine 132 to save data (pertaining to the visualized design) in a graph database (DB) management system 204. Additionally, an example embodiment of the invention such as depicted in FIG. 2 can include using browser capability to display the tree visualization via an SVG interface, and deploying the form designer 130, the visualization engine 132, and the persistence service 134 over a cloud platform, thus enabling software-as-a-service (SaaS) delivery.

Accordingly, one or more embodiments of the invention can include the following implementation flow. A form can be created using form designer 130, and show/hide rules can be applied in the form designer application 130. The designed form and logical dependencies can be published and/or saved, and the saved form design can be consumed as JSON via the visualization engine 132. Such an embodiment can include transforming a JSON form into a hierarchal structure by obtaining the published form JSON schema from NoSQL store 202, transforming, via the visualization engine 132, the JSON form into a hierarchical structure. Such an embodiment can additionally include using the hierarchical structure to detect unreachable dependencies in the form components. The transformed hierarchal structure can also be stored in a graph database 204 using persistence service 134. The hierarchical structure can further be sent to a browser, and rendered using SVG.

Figure 3:
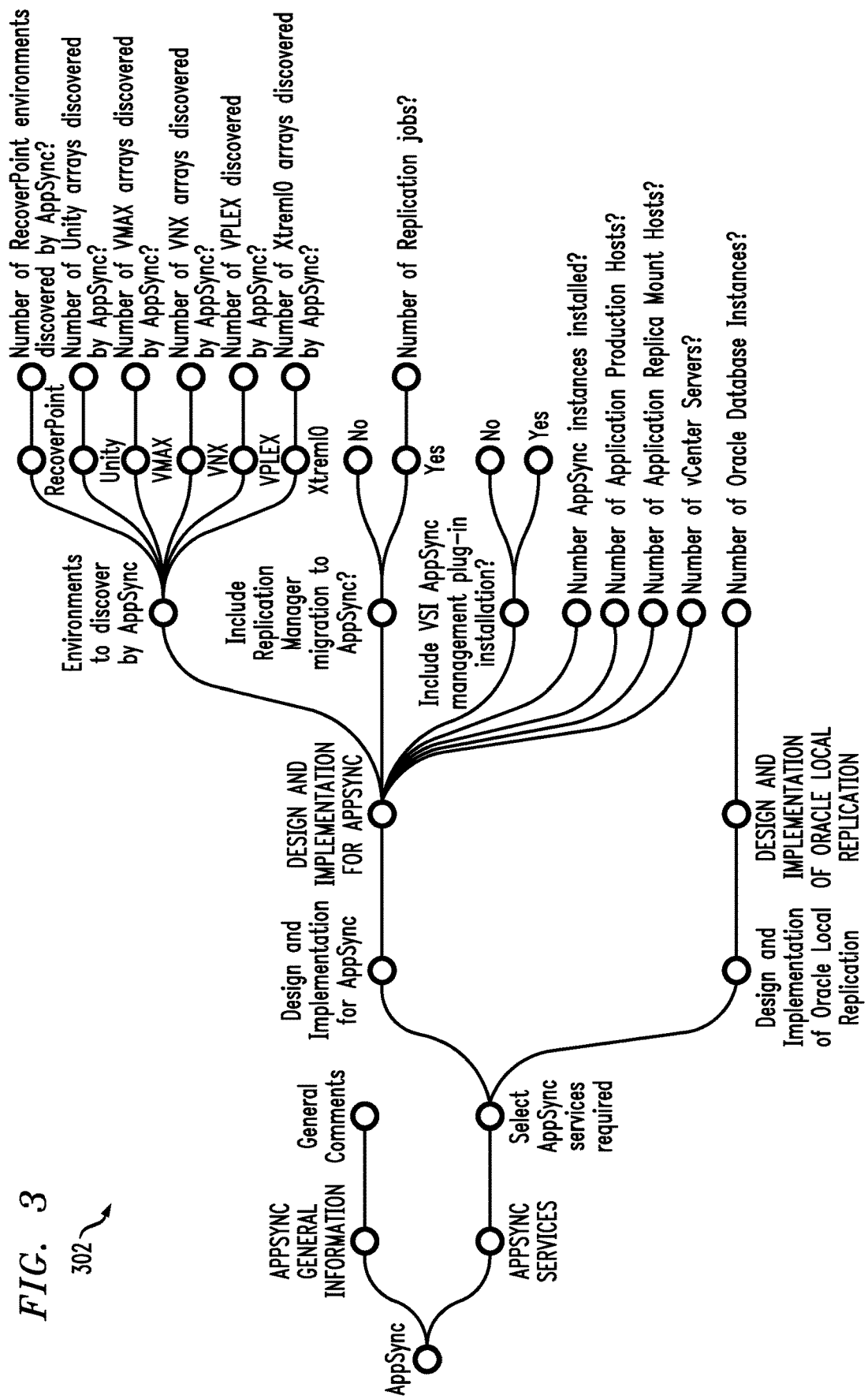
FIG. 3 shows an example hierarchy of dependencies across multiple nodes in an illustrative embodiment of the invention.

FIG. 3 shows an example hierarchy 302 of dependencies across multiple nodes in an illustrative embodiment of the invention. Specifically, FIG. 3 depicts using SVG to paint the hierarchy 302 with all of the hierarchy's dependencies until the $N^{th}$ node. In a hierarchy visualization, such as example hierarchy 302, each node can display the metadata information of the corresponding form component, and each node in hierarchy can be expanded or collapsed to show or hide its child by selecting/clicking on the node.

Referring again to the above-noted implementation flow, the user is enabled to update the form dependencies in (approximately) real-time by dragging-and-dropping nodes (via the visualization) and update the conditional logics of relevant form components to a presentation layer (also in approximately real time). In one or more embodiments of the invention, such form dependency management can include, for example, selecting (say, clicking with a mouse) and holding a particular node from the displayed hierarchy, dragging the selected node to the desired form node where the dependency rule should be applicable, and releasing the node.

Figure 4:
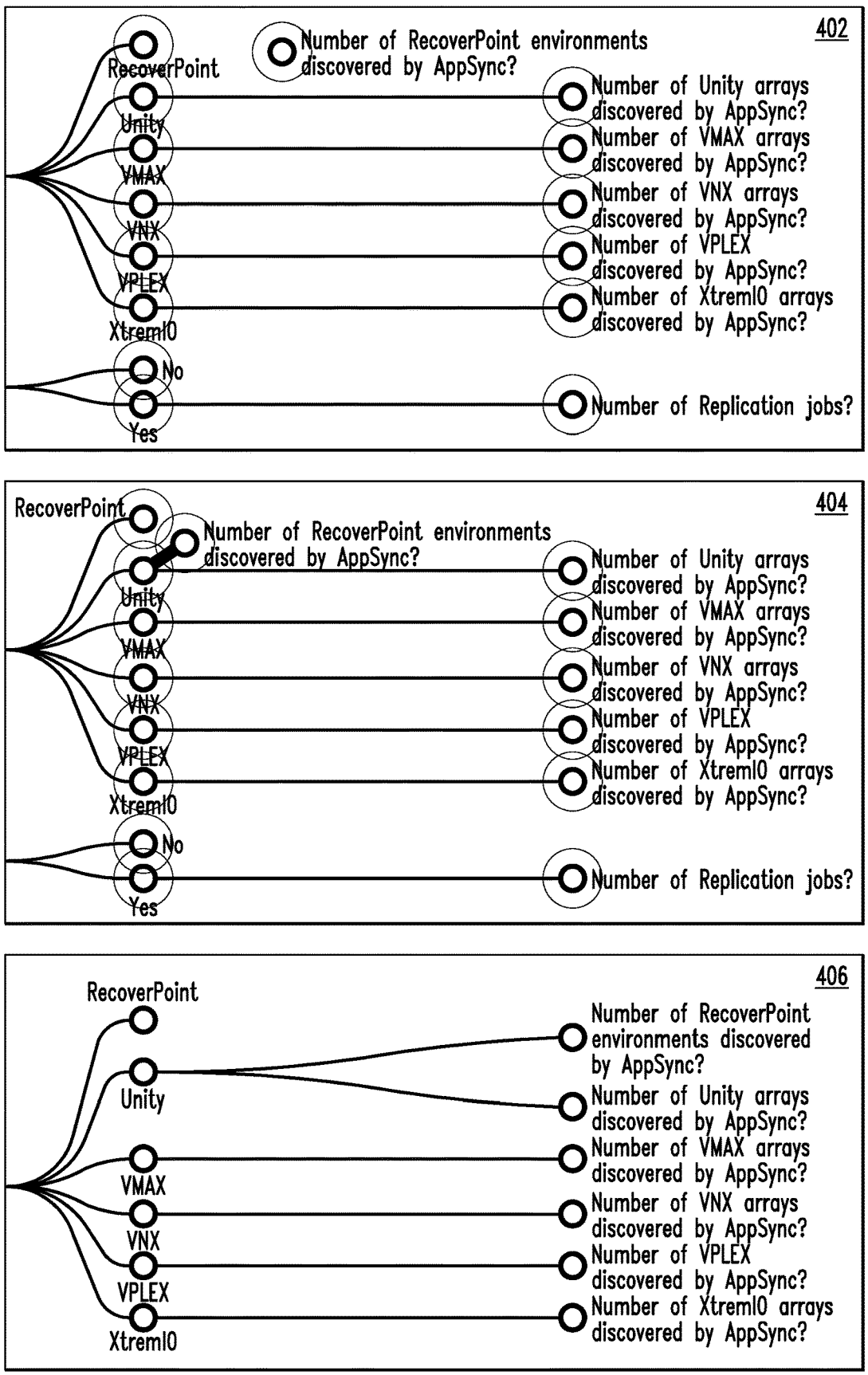
FIG. 4 shows an example of form dependency management in an illustrative embodiment of the invention.

FIG. 4 shows an example of form dependency management in an illustrative embodiment of the invention. By way of illustration, FIG. 4 depicts a hierarchy 402 wherein each node is enabled as being able to be dragged. Additionally, hierarchy 404 depicts attaching a selected node to a desired dependency hierarchy, hierarchy 406 depicts an updated dependency rule in the form based on the dragged-and-dropped node mechanism illustrated in hierarchies 402 and 404.

Referring yet again to the above-noted implementation flow, at least one embodiment of the invention includes identifying and displaying unreachable dependency components in the given form. By way of example, a use case of unreachable dependency components can occur when multiple dependencies are applied to a form component, and there is no path available to the user to reach and/or display that form component. This can also occur, for example, in a case of dependency chaining and multiple show/hide rules.

Such use cases can be induced, for example, by human error. However, as noted, one or more embodiments of the invention can include introducing unreachable dependency while designing forms and displaying the forms in the hierarchal structure with highlighting. Such an embodiment can include, for example, adding, via the form designer, a radio button component and a text area component, and applying a show/hide rule on the text area with multiple conditions. The text area component becomes unreachable regardless of the value of the radio button (Yes, No), and consequently, the text area component will never be displayed in the form user interface (UI). In such an instance, one or more embodiments of the invention can include highlighting, in the hierarchical structure, the text field as an unreachable dependency.

Referring again to the implementation flow, the updated (dependency hierarchy) design can be saved/stored in a graph database (204) using persistence service 134, and can also be utilized to update the actual form in the presentation layer.

Figure 5:
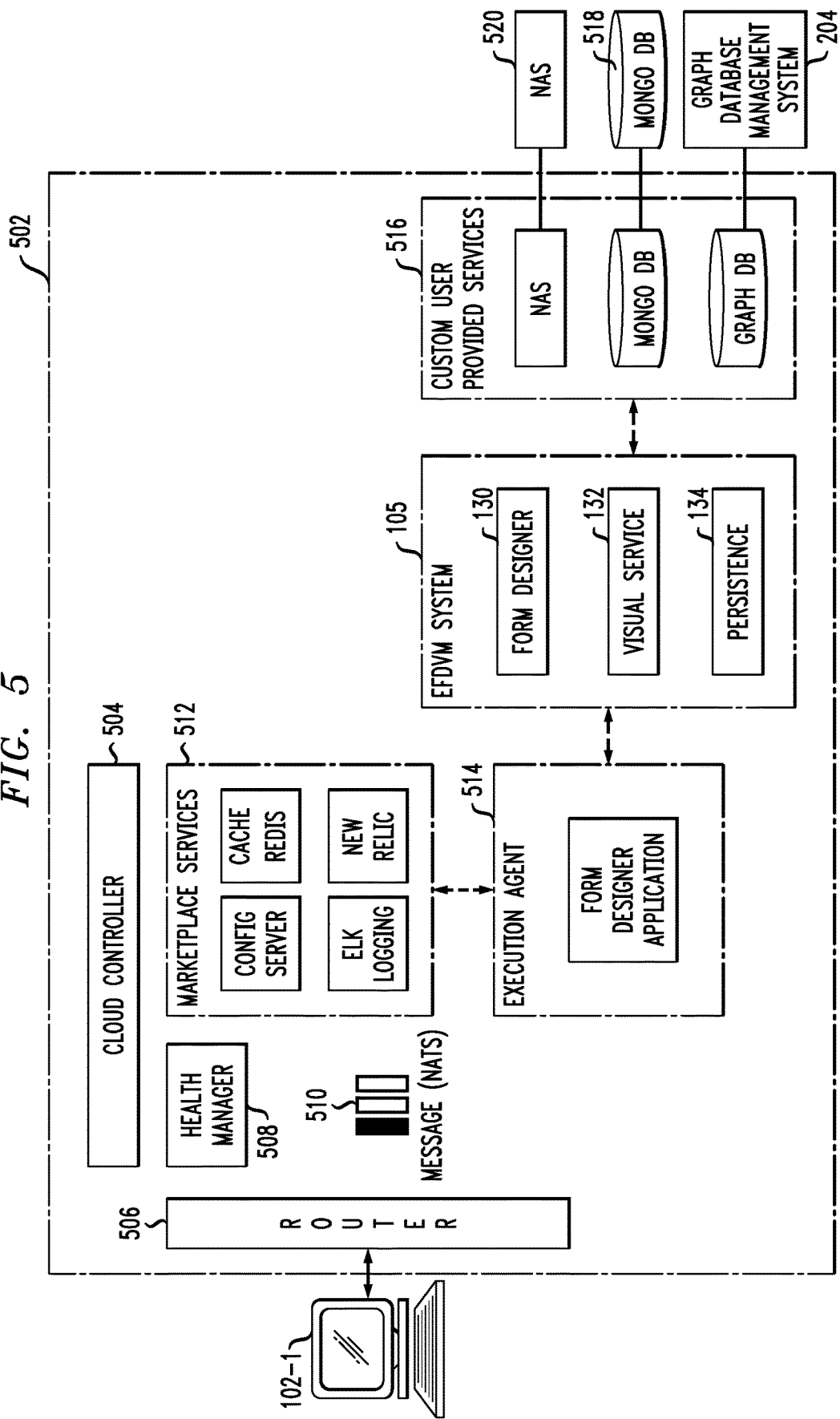
FIG. 5 shows system architecture on a multi-cloud application platform in an illustrative embodiment of the invention.

FIG. 5 shows system architecture on a multi-cloud application platform in an illustrative embodiment of the invention. By way of illustration, FIG. 5 depicts user device 102-1 (implementing a form designer application) interacting with a cloud-hosted platform 502. The cloud-hosted platform 502 includes a cloud platform controller component 504, which is used to direct the deployment of the form designer application. Additionally, the cloud-hosted platform 502 includes a cloud platform router component 506, which is used to route the incoming user requests to one or more appropriate components within the cloud-hosted platform 502. Further, the cloud-hosted platform 502 includes a cloud platform health manager component 508, which monitors the health status of the form designer application, and also includes a distributed queueing and messaging system 510 of the cloud-hosted platform 502. The cloud-hosted platform 502 additionally includes a collection of cloud platform services 512, which can be used for application logging, monitoring, session management, etc. Also, the cloud-hosted platform 502 includes an execution agent 514, which can be used to design the form (via the form design application) using a drag-and-drop interface and updated form dependency (show-hide) rules. As illustrated in FIG. 5, the execution agent 514 interacts with the EFDVM system 105, which interacts with a collection of user-provided services 516 that can operate in conjunction with additional components such as one or more databases 520 used to store documents in network-attached storage (NAS), an NoSQL database 518 to store form designs, and a graph database 204 to store the hierarchal structure.

Additionally, one or more embodiments of the invention include development and implementation of Java classes (such as depicted in FIG. 6 through FIG. 11) to transform JSON based schema to a tree/graphical hierarchy of dynamic forms with capabilities such as detailed herein.

Figure 6:
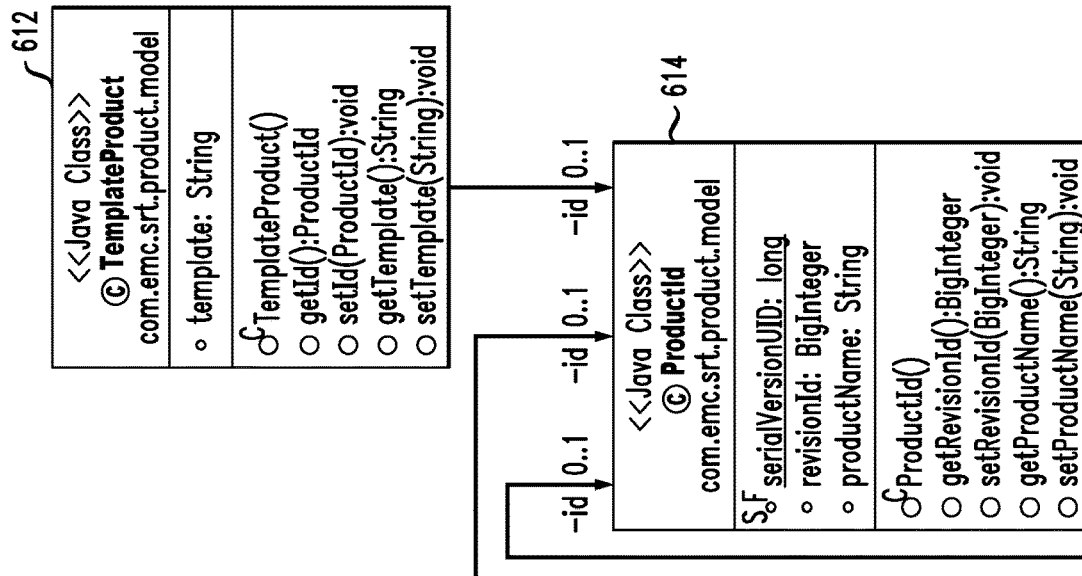
FIG. 6 shows an association class diagram for a form designer micro-service in an illustrative embodiment of the invention.
Figure 6:
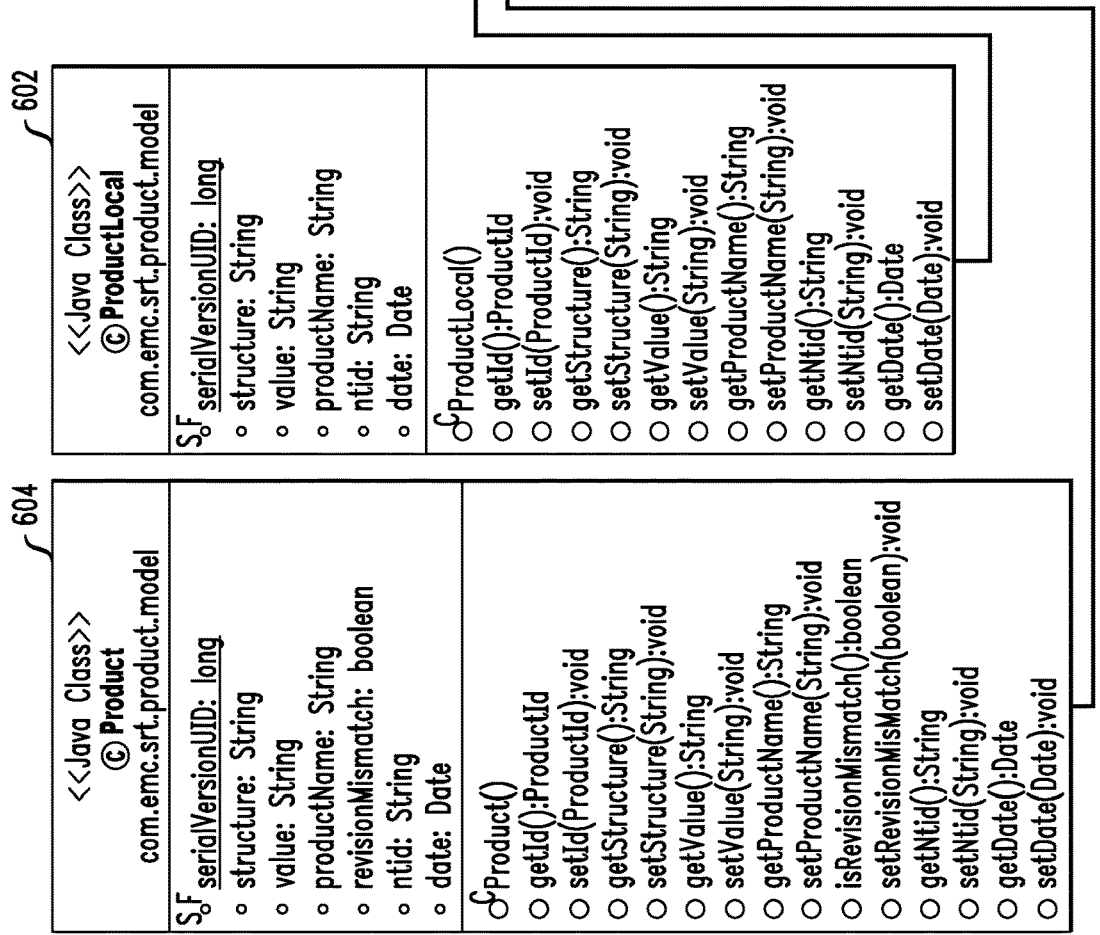
Figure 6:
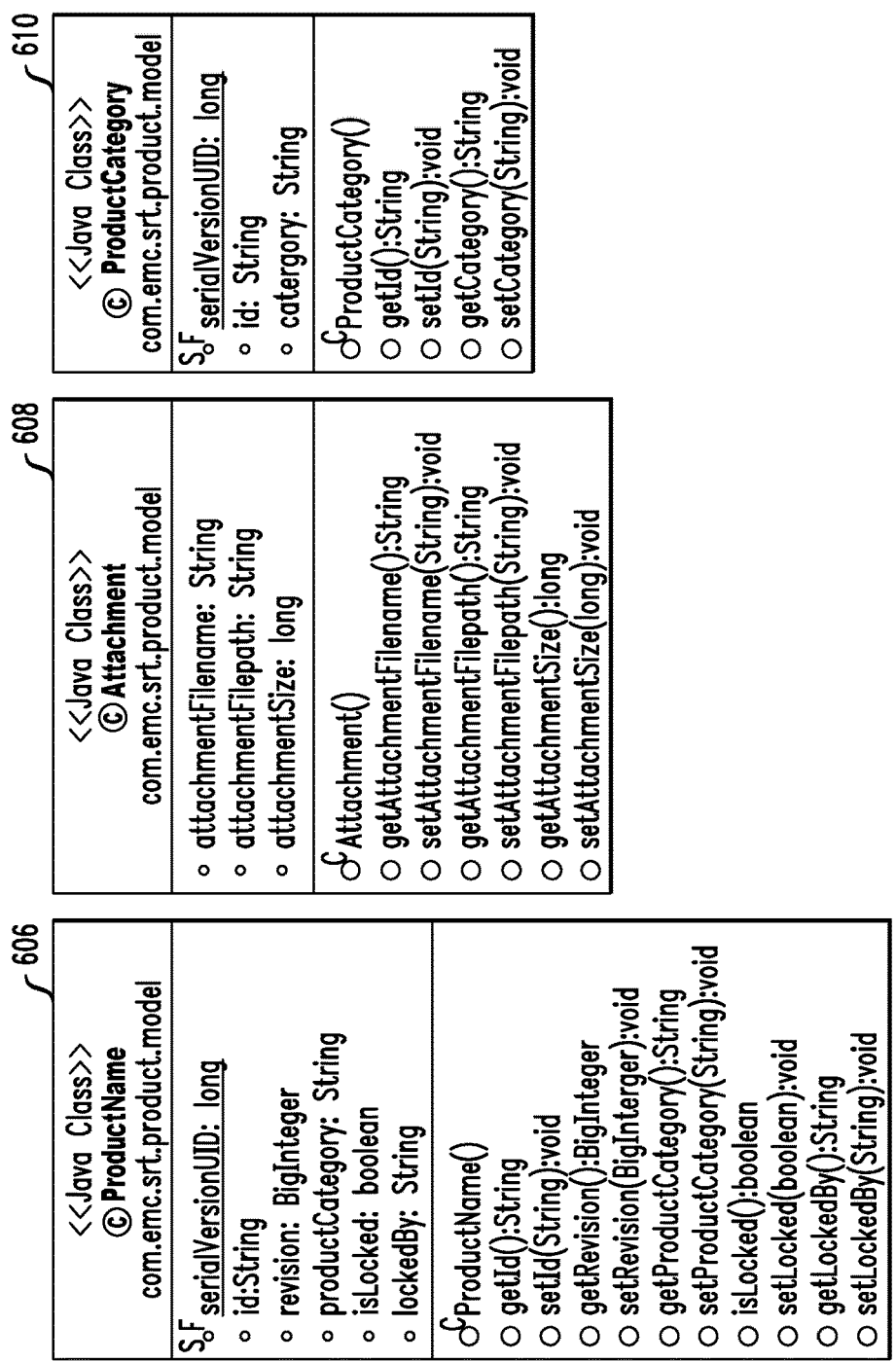

FIG. 6 shows an association class diagram for a form designer micro-service in an illustrative embodiment of the invention. In the example depicted in FIG. 6, various Java classes can be utilized in the EFDVM system 105. Such Java classes can include, for example, a local product class 602, a product class 604, a product name class 606, an attachment class 608, a product category class 610, a product template class 612, and a product ID class 614.

More specifically, the local product class 602 (ProductLocal) is used to store the non-published presentation layer JSON data comprising its structure and values. Additionally, the product class 604 (Product) is used to store the published and approved version of the presentation layer with revision specifications along with structure and value details of the presentation layer. The product name class 606 (ProductName) is used to store the name of the designed content, the attachment class 608 (Attachment) is used to store attachment-related metadata information, and the product category class 610 (ProductCategory) is used to distinguish the generated contents category. Further, the product template class 612 (TemplateProduct) is used to generate the template information utilized by a free marker templates engine, and the product ID class 614 (ProductId) is a super class of Product, ProductLocal and TemplateProduct for uniquely identifying the stored JSON schema structure ID.

Figure 7:
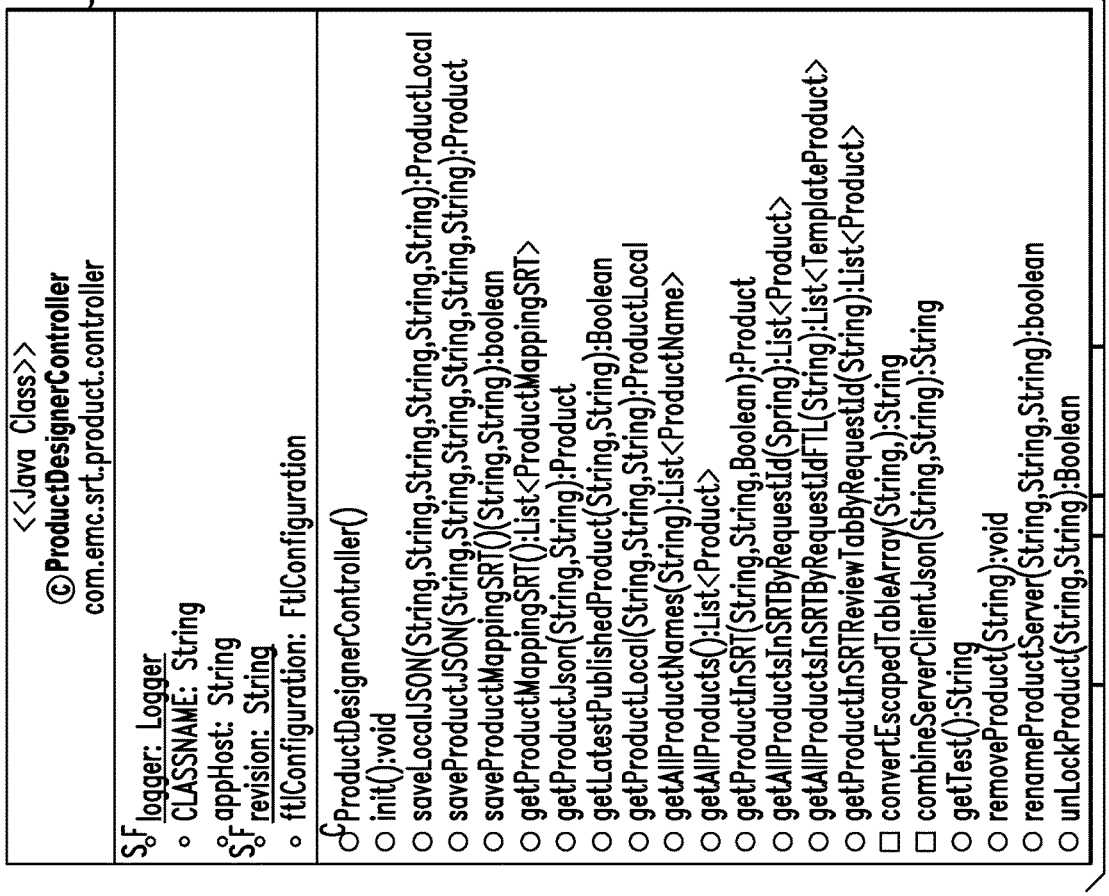
FIG. 7 shows a controller and repository association class diagram for a form designer micro-service in an illustrative embodiment of the invention.
Figure 7:
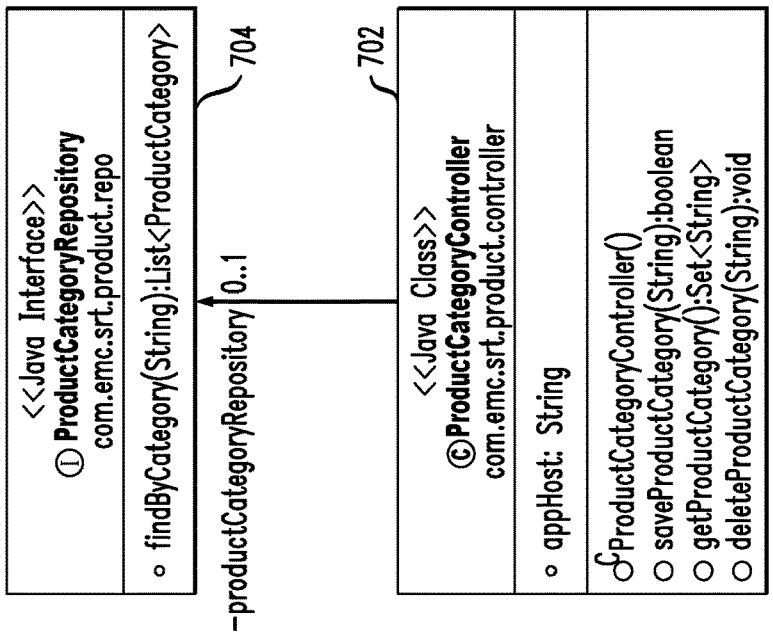
Figure 7:
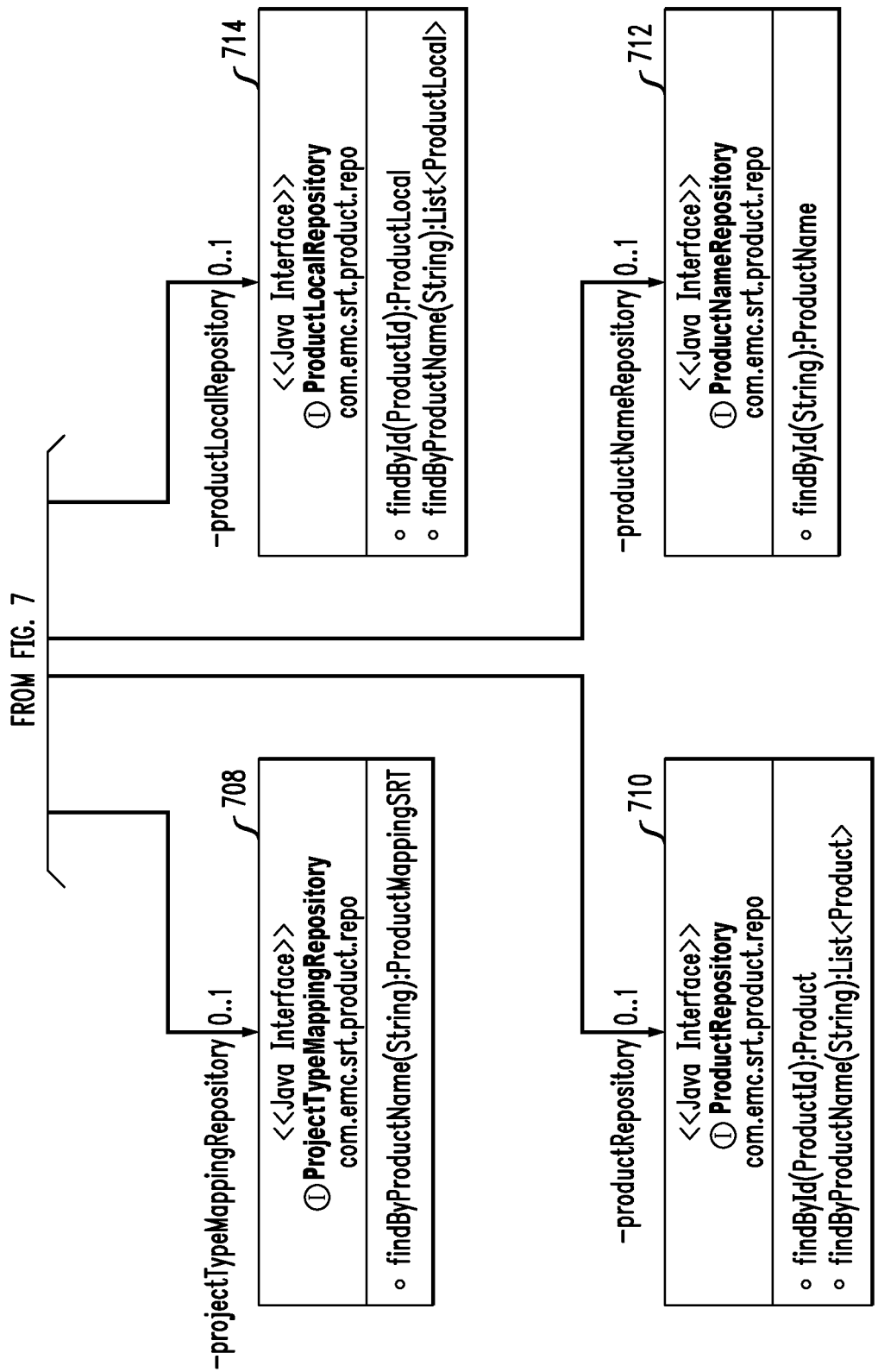

FIG. 7 shows a controller and repository association class diagram for a form designer micro-service in an illustrative embodiment of the invention. In the example depicted in FIG. 7, various Java classes can be utilized in the EFDVM system 105. Such Java classes can include, for example, a product category controller class 702, a product category repository class 704, a product designer controller class 706, a product type mapping repository class 708, a product repository class 710, a product name repository class 712, and a local product repository class 714.

More specifically, the product category controller class 702 (ProductCategoryController) stores the designed presentation layer category, and the product category repository class 704 (ProductCategoryRepository) relates to an interface establishing a contract for interfacing with an NoSQL database to store the designed presentation layer category. Also, the product designer controller class 706 (ProductDesignerController) provides implementation classes of a product micro-service written using the Spring boot technology framework, and provides generic implementation of end points and business logics that govern the publish and design process from the enterprise services framework for presentation layer management. Additionally, the product type mapping repository class 708 (ProjectTypeMappingRepository) relates to an interface establishing a contract for interfacing with an NoSQL database, and the product repository class 710 (ProductRepository) relates to an interface establishing a contract for interfacing with an NoSQL database linking designed presentation layer content with its category. Further, the product name repository class 712 (ProductNameRepository) relates to an interface establishing a contract for interfacing with an NoSQL database to store the names of the designed presentation layer data, and the local product repository class 714 (ProductLocalRepository) relates to an interface establishing a contract for interfacing with an NoSQL database for non-published presentation layer content.

Figure 8:
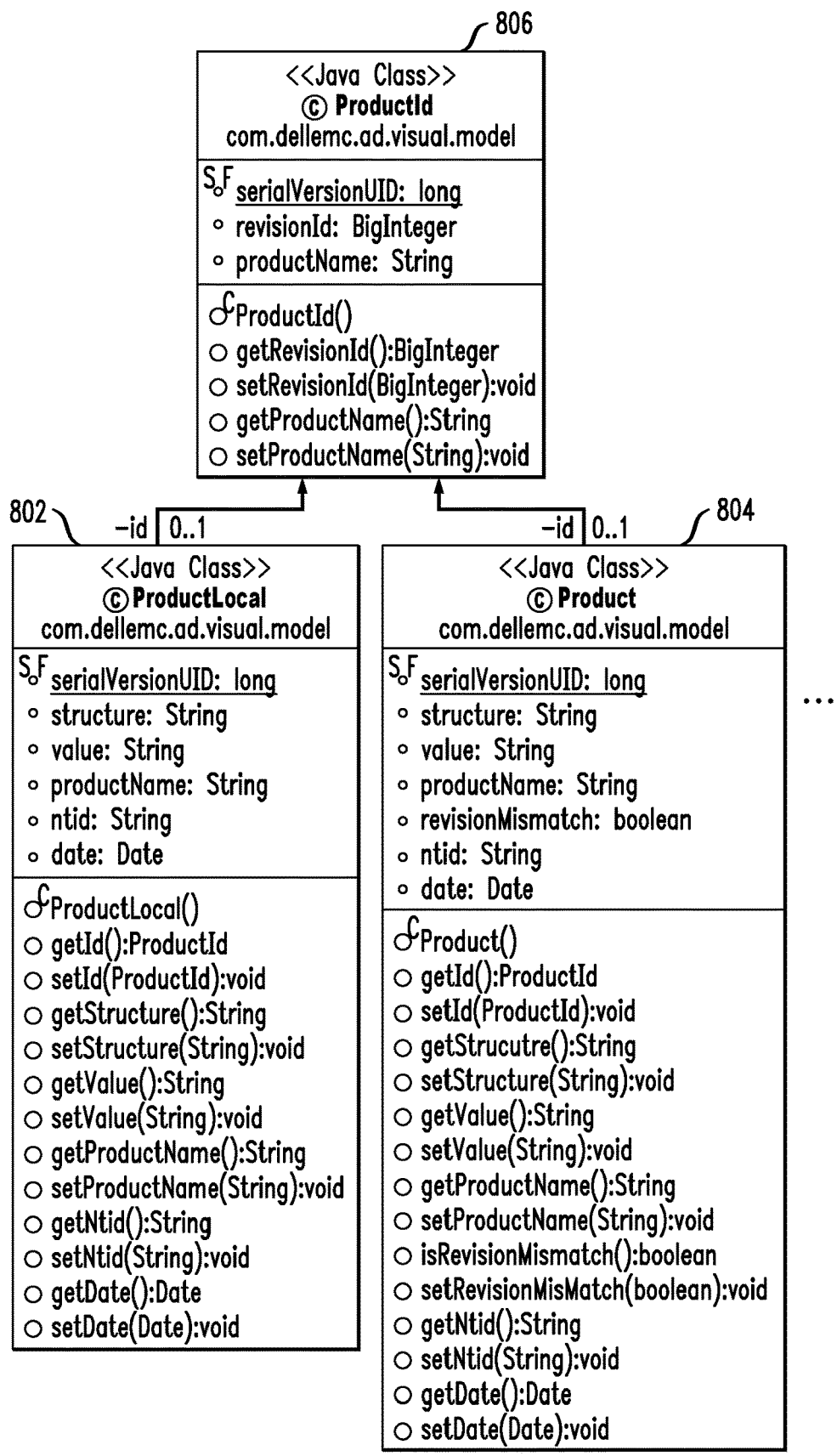
FIG. 8 shows a class association diagram for a visualization micro-service in an illustrative embodiment of the invention.
Figure 8:
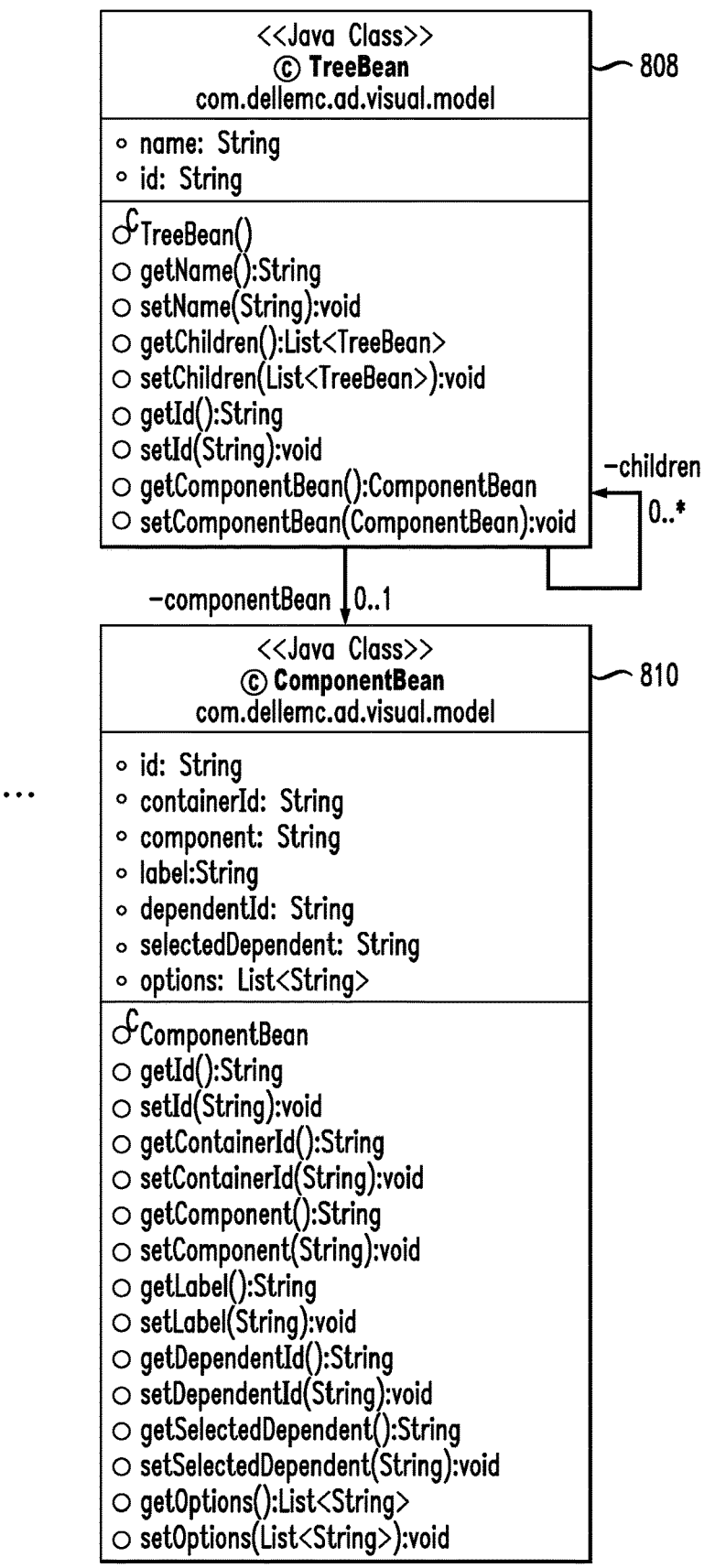

FIG. 8 shows a class association diagram for a visualization micro-service in an illustrative embodiment of the invention. In the example depicted in FIG. 8, various Java classes can be utilized in the EFDVM system 105. Such Java classes can include, for example, a local product class 802, a product class 804, a product ID class 806, a tree class 808, and a component class 810.

More specifically, the local product class 802 (ProductLocal) is used to store the non-published presentation layer JSON data comprising its structure and values, and the product class 804 (Product) is used to store the published and approved version of the presentation layer with revision specifications along with structure and value details of presentation layer. Additionally, the product ID class 806 (ProductId) is a super class of Product, ProductLocal and TemplateProduct for uniquely identifying the stored JSON schema structure ID. Further, the tree class 808 (TreeBean) is used to store the transformed hierarchal structure of presentation layer JSON data, and the component class 810 (ComponentBean) is a super class of TreeBean used to store metadata information of the transformed hierarchal structure.

Figure 9:
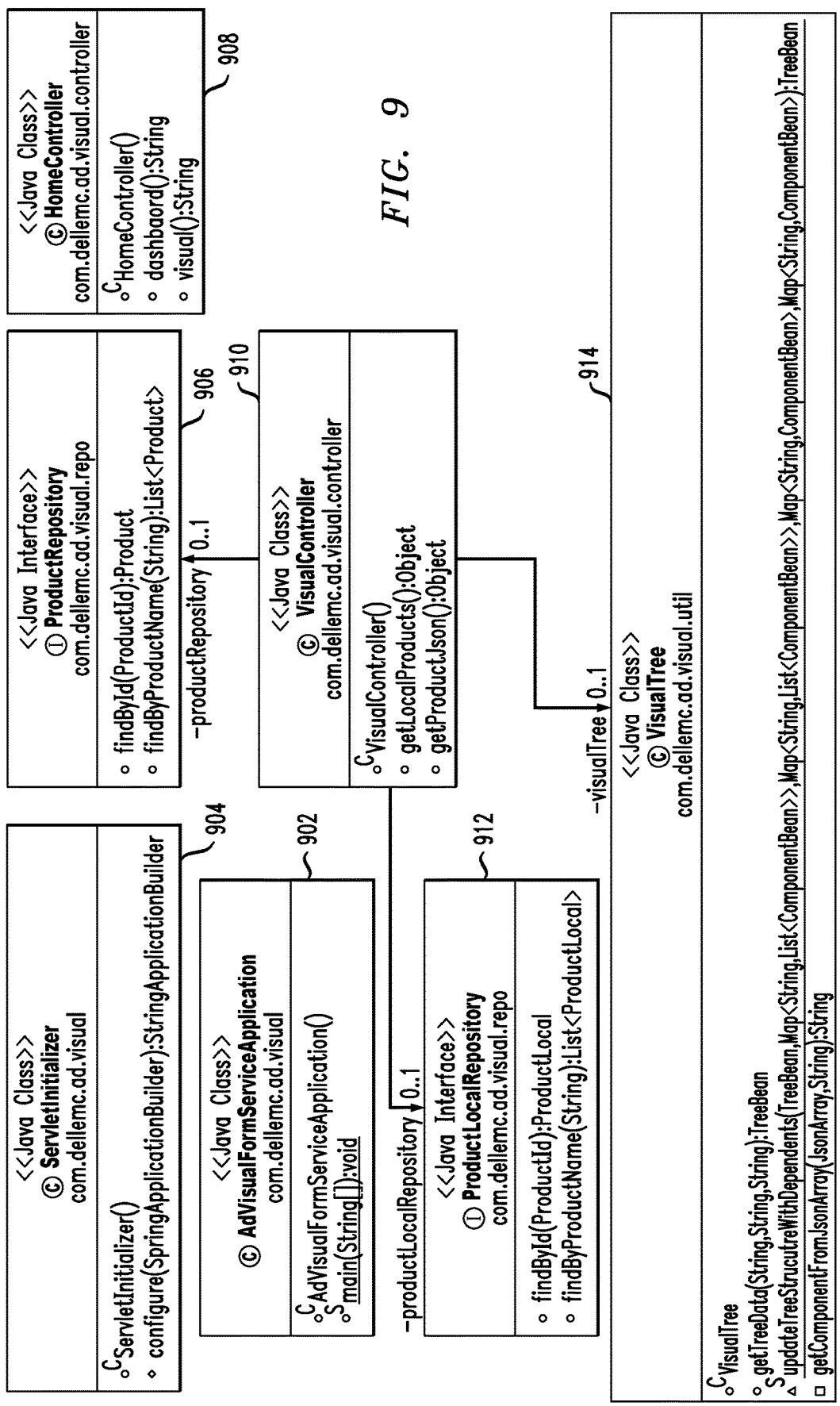
FIG. 9 shows a controller and repository association diagram for a visualization micro-service in an illustrative embodiment of the invention.

FIG. 9 shows a controller and repository association diagram for a visualization micro-service in an illustrative embodiment of the invention. In the example depicted in FIG. 9, various Java classes can be utilized in the EFDVM system 105. Such Java classes can include, for example, a visual form service application class 902, a servlet initializer class 904, a product repository class 906, a home controller class 908, a visual controller class 910, a local product repository class 912, and a visual tree class 914.

More specifically, the visual form service application class 902 (AdVisualFormServiceApplication) provides a convenient way to bootstrap and launch a visual micro-service, and the servlet initializer class 904 (ServletInitializer) is a Java class extending the SpringBootServletInitializer class, which allows configuration of the visual micro-service by overriding the configure method. Additionally, the product repository class 906 (ProductRepository) relates to an interface establishing a contract for interfacing with an NoSQL database of approved and published presentation layer content, and the home controller class 908 (HomeController) provides a representational state transfer (REST) end-point to an interface with the view of the visualization micro-service. Further, the visual controller class 910 (VisualController) provides a generic API end-point for converting JSON data of the presentation layer to a hierarchal structure, the local product repository class 912 (ProductLocalRepository) relates to an interface establishing a contract for interfacing with an NoSQL database of non-published presentation layer content, and the visual tree class 914 (VisualTree) is a Spring component class that provides the implementation of transforming the presentation layer JSON data to a hierarchal structure.

Figure 10:
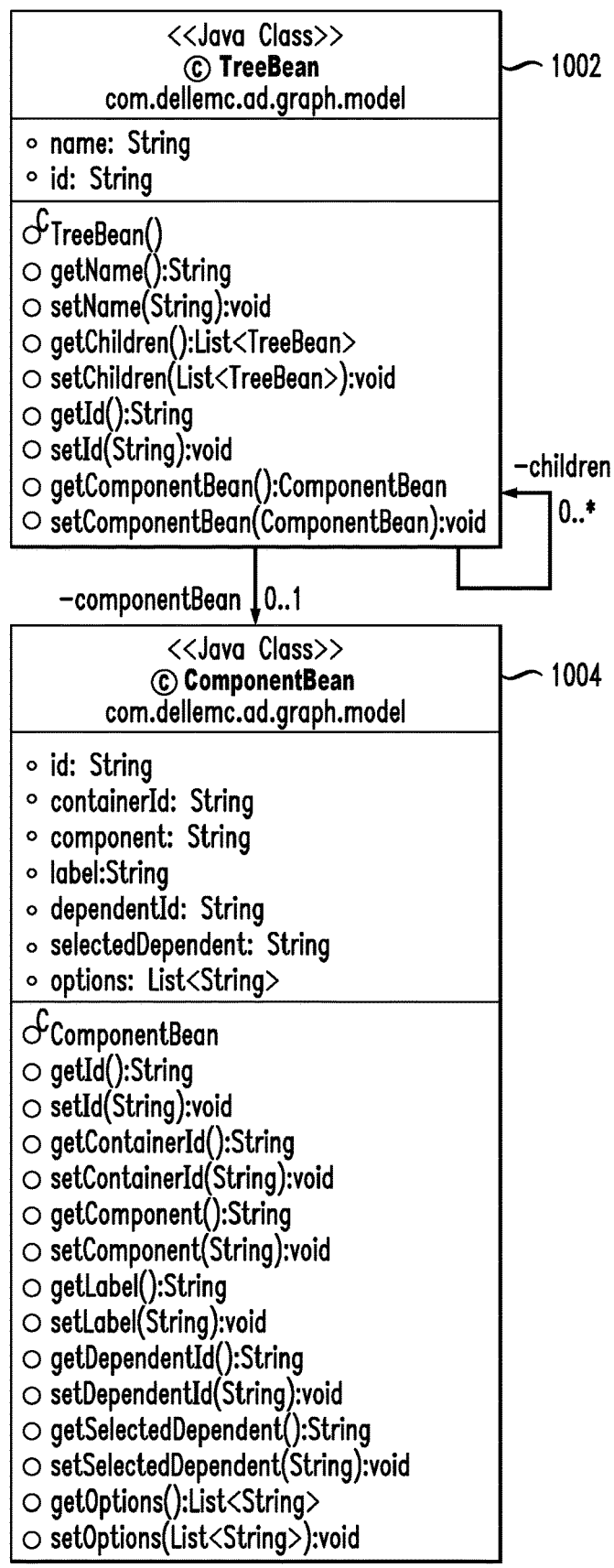
FIG. 10 shows a class association diagram for a persistence micro-service in an illustrative embodiment of the invention.

FIG. 10 shows a class association diagram for a persistence micro-service in an illustrative embodiment of the invention. In the example depicted in FIG. 10, various Java classes can be utilized in the EFDVM system 105. Such Java classes can include, for example, a tree class 1002, and a component class 1004.

More specifically, the tree class 1002 (TreeBean) is used to store the transformed hierarchal structure of presentation layer JSON data, and the component class 1004 (ComponentBean) is a super class of TreeBean used to store metadata information of the transformed hierarchal structure.

Figure 11:
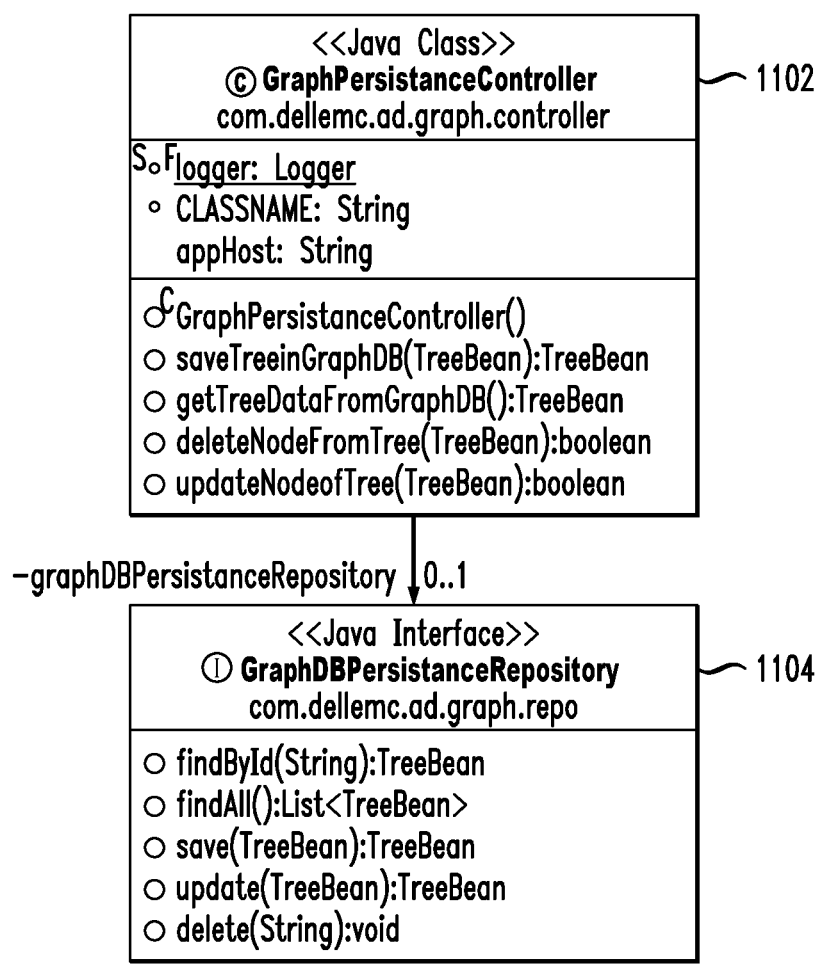
FIG. 11 shows a controller and repository association class diagram for a persistence micro-service in an illustrative embodiment of the invention.

FIG. 11 shows a controller and repository association class diagram for a persistence micro-service in an illustrative embodiment of the invention. In the example depicted in FIG. 11, various Java classes can be utilized in the EFDVM system 105. Such Java classes can include, for example, a graph persistence controller class 1102, and a graph database persistence repository class 1104.

More specifically, the graph persistence controller class 1102 (GraphPersistanceController) provides implementation of the persistence micro-service to save the hierarchal data in a graph database, and the graph database persistence repository class 1104 (GraphDBPersistanceRepository) relates to an interface establishing a contract for interfacing with a graph database to store the transformed hierarchal structure of presentation layer.

Figure 12:
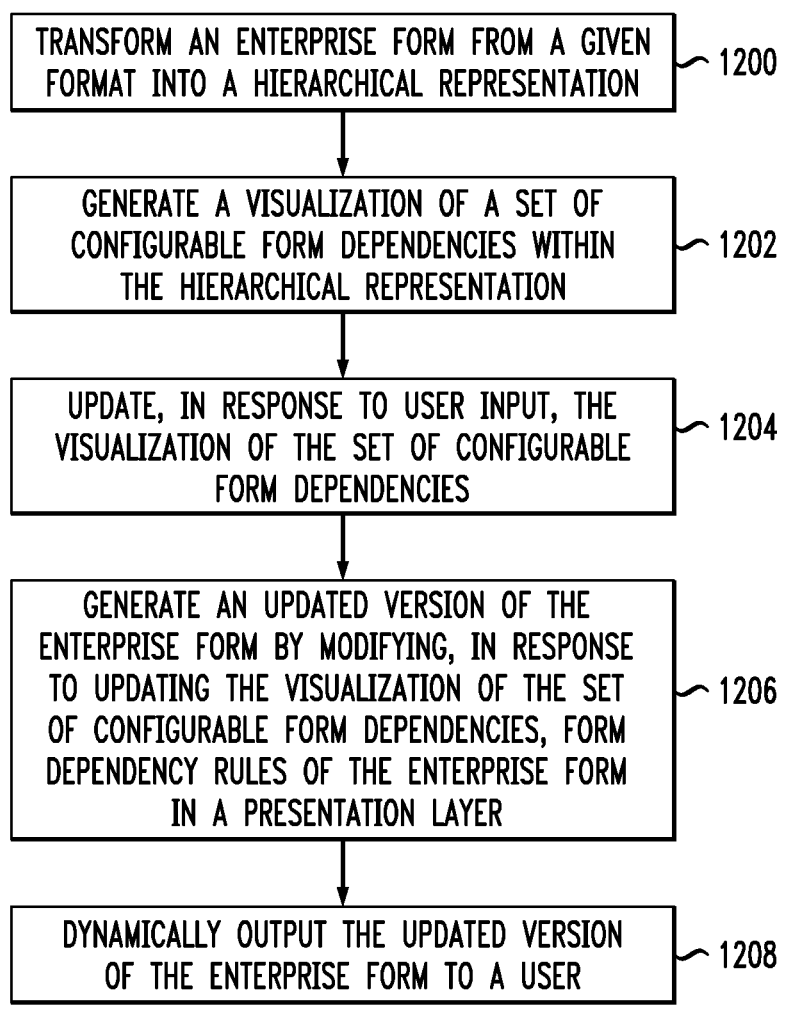
FIG. 12 is a flow diagram of a process for application development via presentation layer management in an illustrative embodiment.

FIG. 12 is a flow diagram of a process for application development via presentation layer management in an illustrative embodiment. It is to be understood that this particular process is only an example, and additional or alternative processes can be carried out in other embodiments.

In this embodiment, the process includes steps 1200 through 1208. These steps are assumed to be performed by the processor 120 utilizing its modules 130, 132, and 134.

Step 1200 includes transforming an enterprise form from a given format into a hierarchical representation. The given format can include, for example, a JAVASCRIPT object notation format. Transforming the enterprise form can include rendering the hierarchical representation using an extensible markup language-based vector image format. Also, at least one embodiment of the invention includes storing the hierarchal representation in a graph database via a persistence service.

Step 1202 includes generating a visualization of a set of one or more configurable form dependencies within the hierarchical representation. Generating the visualization can include detecting one or more unreachable dependencies within the enterprise form. Additionally, detecting the one or more unreachable dependencies can include performing link analysis on the enterprise form. Also, at least one embodiment of the invention includes outputting the generated visualization to one or more web browsers associated with the user.

Step 1204 includes updating, in response to user input, the visualization of the set of one or more configurable form dependencies. The user input can include, for example, dragging and dropping of one or more nodes within the hierarchical representation, wherein the one or more nodes represent one or more of the configurable form dependencies.

Step 1206 includes generating an updated version of the enterprise form by modifying, in response to updating the visualization of the set of one or more configurable form dependencies, one or more form dependency rules of the enterprise form in a presentation layer associated with the enterprise form. The one or more form dependency rules can include one or more elements of conditional logic.

Step 1208 includes dynamically outputting the updated version of the enterprise form to at least one user. Additionally, at least one embodiment of the invention includes storing the updated version of the enterprise form in a graph database via a persistence service.

Accordingly, the particular processing operations and other functionality described in conjunction with the flow diagram of FIG. 12 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, one or more embodiments of the invention include providing the ability to view and update form dependencies via a single screen with graphical representation, as well as enabling users to add and/or update conditional logics within the graphical representation via a drag-and-drop mechanism.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AMAZON WEB SERVICES (AWS), GOOGLE Cloud Platform (GCP) and MICROSOFT Azure. Virtual machines provided in such systems can be used to implement at least portions of one or more of a computer system and a content addressable storage system in illustrative embodiments. These and other cloud-based systems in illustrative embodiments can include object stores such as AMAZON S3, GCP Cloud Storage, and MICROSOFT Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 13 and 14. Although described in the context of system 100, these platforms may also be used to implement at least portions of other information processing systems in other embodiments.

Figure 13:
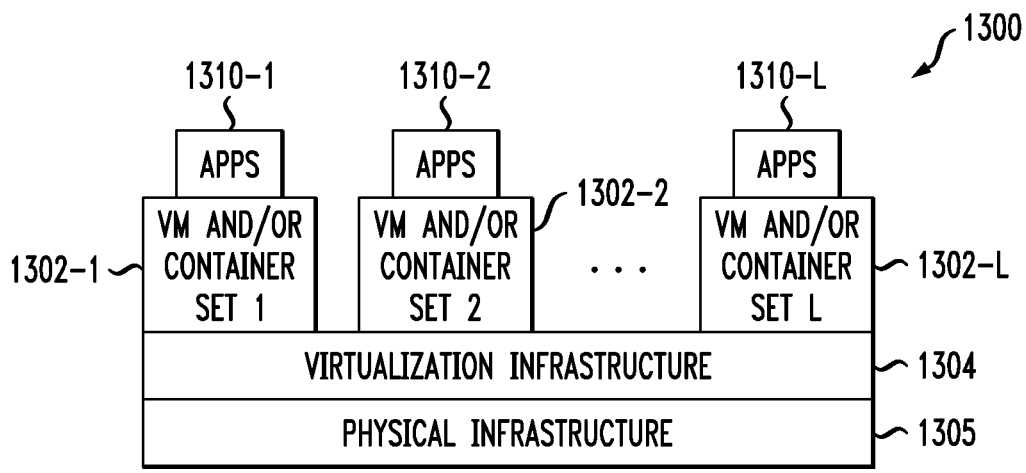
FIGS. 13 and 14 show examples of processing platforms that may be utilized to implement at least a portion of an information processing system in illustrative embodiments.
Figure 14:
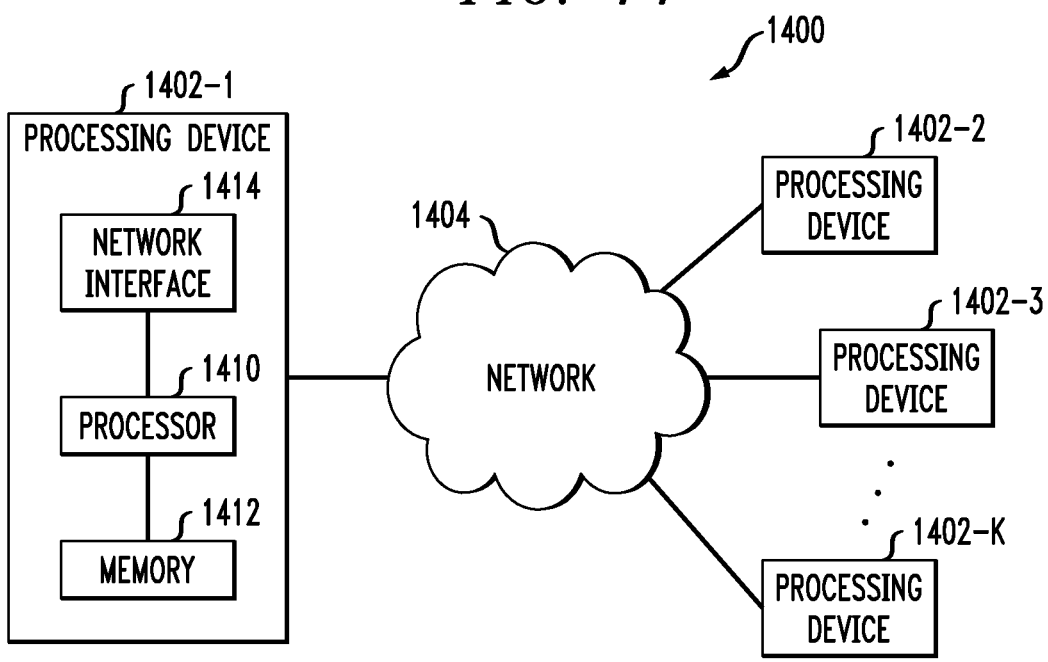

FIG. 13 shows an example processing platform comprising cloud infrastructure 1300. The cloud infrastructure 1300 comprises a combination of physical and virtual processing resources that may be utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. An example of a hypervisor platform that may be used to implement a hypervisor within the virtualization infrastructure 1304 is the VMware® vSphere® which may have an associated virtual infrastructure management system such as the VMware® vCenter™. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA) or other type of processing circuitry, as well as portions or combinations of such circuitry elements.

The memory 1412 may comprise random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of DELL EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from DELL EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide accurate and improved enterprise form representation and visualization. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising steps of:
transforming an enterprise form from a given format into a hierarchical representation;
generating a visualization of a set of one or more configurable form dependencies within the hierarchical representation, wherein generating the visualization comprises identifying and displaying one or more unreachable components of the one or more configurable form dependencies, wherein each unreachable component comprises a component of the enterprise form for which no path in the hierarchical representation is available to a user of the enterprise form to access the component;
updating, in response to user input, the visualization of the set of one or more configurable form dependencies, wherein updating the visualization comprises precluding the one or more unreachable components from the visualization by applying a hide rule on at least one text area associated with each of the one or more unreachable components;
generating an updated version of the enterprise form by modifying, in response to updating the visualization of the set of one or more configurable form dependencies, one or more form dependency rules of the enterprise form in a presentation layer associated with the enterprise form; and
dynamically outputting the updated version of the enterprise form to at least one user;
wherein the steps are performed by at least one processing device comprising a processor coupled to a memory.

2. The computer-implemented method of claim 1, wherein the given format comprises a text-based format.

3. The computer-implemented method of claim 1, wherein transforming the enterprise form comprises rendering the hierarchical representation using an extensible markup language-based vector image format.

4. The computer-implemented method of claim 1, wherein detecting the one or more unreachable components comprises performing link analysis on the enterprise form.

5. The computer-implemented method of claim 1, further comprising:
outputting the generated visualization to one or more web browsers associated with the user.

6. The computer-implemented method of claim 1, wherein the user input comprises dragging and dropping of one or more nodes within the hierarchical representation, wherein the one or more nodes represent one or more of the configurable form dependencies.

7. The computer-implemented method of claim 1, wherein the one or more form dependency rules comprise one or more elements of conditional logic.

8. The computer-implemented method of claim 1, further comprising:
storing the hierarchal representation in a graph database via a persistence service.

9. The computer-implemented method of claim 1, further comprising:
storing the updated version of the enterprise form in a graph database via a persistence service.

10. A non-transitory processor-readable storage medium having stored therein program code of one or more software programs, wherein the program code when executed by at least one processing device causes the at least one processing device:
- to transform an enterprise form from a given format into a hierarchical representation;
- to generate a visualization of a set of one or more configurable form dependencies within the hierarchical representation, wherein generating the visualization comprises identifying and displaying one or more unreachable components of the one or more configurable form dependencies, wherein each unreachable component comprises a component of the enterprise form for which no path in the hierarchical representation is available to a user of the enterprise form to access the component;
- to update, in response to user input, the visualization of the set of one or more configurable form dependencies, wherein updating the visualization comprises precluding the one or more unreachable components from the visualization by applying a hide rule on at least one text area associated with each of the one or more unreachable components;
- to generate an updated version of the enterprise form by modifying, in response to updating the visualization of the set of one or more configurable form dependencies, one or more form dependency rules of the enterprise form in a presentation layer associated with the enterprise form; and
- to dynamically output the updated version of the enterprise form to at least one user.

11. The non-transitory processor-readable storage medium of claim 10, wherein transforming the enterprise form comprises rendering the hierarchical representation using an extensible markup language-based vector image format.

12. The non-transitory processor-readable storage medium of claim 10, wherein the user input comprises dragging and dropping of one or more nodes within the hierarchical representation, wherein the one or more nodes represent one or more of the configurable form dependencies.

13. The non-transitory processor-readable storage medium of claim 10, wherein the program code when executed by at least one processing device further causes the at least one processing device:
- to store the hierarchal representation and the updated version of the enterprise form in a graph database via a persistence service.

14. The non-transitory processor-readable storage medium of claim 10, wherein the one or more form dependency rules comprise one or more elements of conditional logic.

15. The non-transitory processor-readable storage medium of claim 10, wherein detecting the one or more unreachable components comprises performing link analysis on the enterprise form.

16. An apparatus comprising:
- at least one processing device comprising a processor coupled to a memory;
- the at least one processing device being configured:
  - to transform an enterprise form from a given format into a hierarchical representation;
  - to generate a visualization of a set of one or more configurable form dependencies within the hierarchical representation, wherein generating the visualization comprises identifying and displaying one or more unreachable components of the one or more configurable form dependencies, wherein each unreachable component comprises a component of the enterprise form for which no path in the hierarchical representation is available to a user of the enterprise form to access the component;
  - to update, in response to user input, the visualization of the set of one or more configurable form dependencies, wherein updating the visualization comprises precluding the one or more unreachable components from the visualization by applying a hide rule on at least one text area associated with each of the one or more unreachable components;
  - to generate an updated version of the enterprise form by modifying, in response to updating the visualization of the set of one or more configurable form dependencies, one or more form dependency rules of the enterprise form in a presentation layer associated with the enterprise form; and
  - to dynamically output the updated version of the enterprise form to at least one user.

17. The apparatus of claim 16, wherein transforming the enterprise form comprises rendering the hierarchical representation using an extensible markup language-based vector image format.

18. The apparatus of claim 16, wherein the user input comprises dragging and dropping of one or more nodes within the hierarchical representation, wherein the one or more nodes represent one or more of the configurable form dependencies.

19. The apparatus of claim 16, the at least one processing device being further configured:
- to store the hierarchal representation and the updated version of the enterprise form in a graph database via a persistence service.

20. The apparatus of claim 16, wherein the one or more form dependency rules comprise one or more elements of conditional logic.

* * * * *